2 Sheets—Sheet 1.

D. HUSTON,

Assignor, by mesne assignments, to THE HUSTON SHIP'S BERTH COMPANY.

Self-Leveling Berth for Vessels.

No. 9,224. Reissued June 1, 1880.

*Witnesses,*
W. J. Cambridge
Chas. E. Griffin

*Inventor,*
David Huston
per P. C. Teschemacher
Atty.

N. PETERS, PHOTO-LITHOGRAPHER, WASHINGTON, D. C.

2 Sheets—Sheet 2.

D. HUSTON,

Assignor, by mesne assignments, to THE HUSTON SHIP'S BERTH COMPANY.

Self-Leveling Berth for Vessels.

No. 9,224. Reissued June 1, 1880.

Witnesses,
W. J. Cambridge
Chas. E. Griffin

Inventor,
David Huston
per R. E. Teschemacher
Atty

N. PETERS, PHOTO-LITHOGRAPHER, WASHINGTON, D.C.

UNITED STATES PATENT OFFICE.

DAVID HUSTON, OF BOSTON, MASSACHUSETTS, ASSIGNOR, BY MESNE ASSIGNMENTS, TO THE HUSTON SHIPS BERTH COMPANY, OF SAME PLACE.

SELF-LEVELING BERTH FOR VESSELS.

SPECIFICATION forming part of Reissued Letters Patent No. 9,224, dated June 1, 1880.

Original No. 222,049, dated November 25, 1879. Application for reissue filed April 8, 1880.

*To all whom it may concern:*

Be it known that I, DAVID HUSTON, of Boston, in the county of Suffolk and State of Massachusetts, have invented certain Improvements in Self-Leveling Berths for Vessels, of which the following is a full, clear, and exact description, reference being had to the accompanying drawings, making part of this specification, in which—

Figure 1:
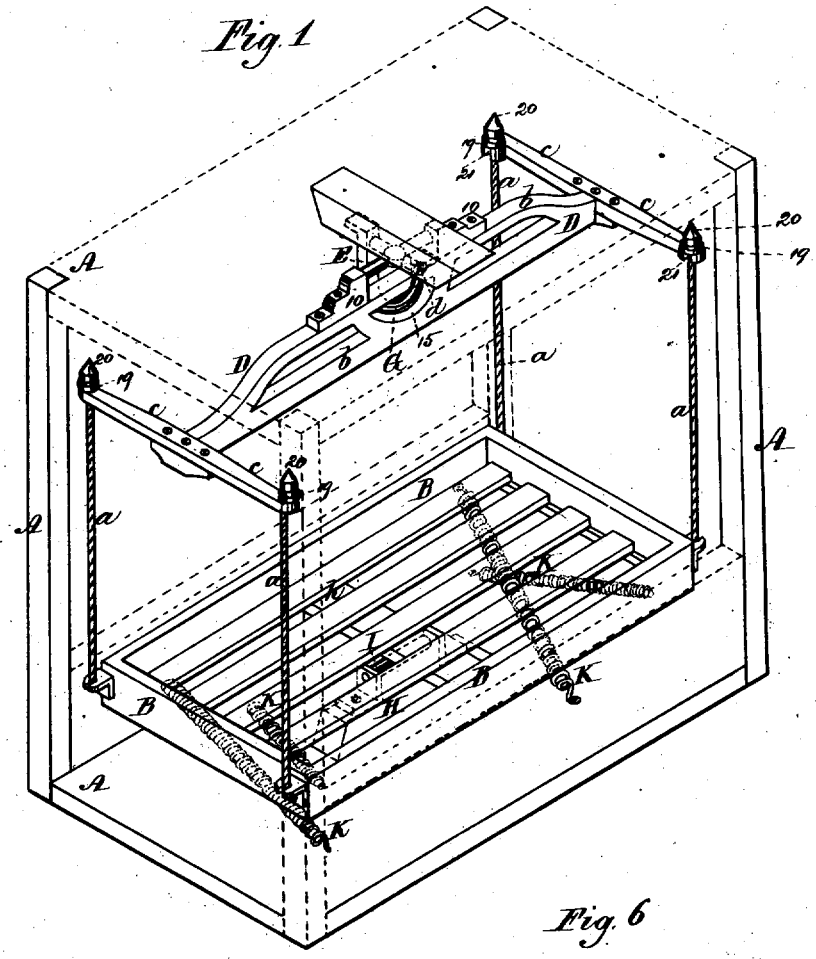
Figure 6:
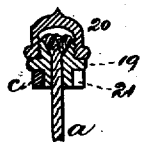
Figure 2:
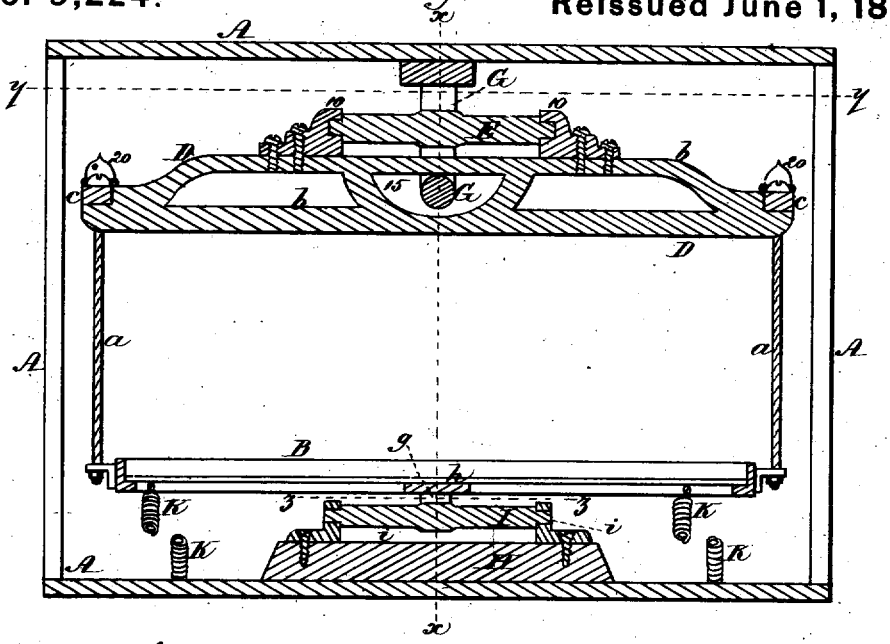
Figure 3:
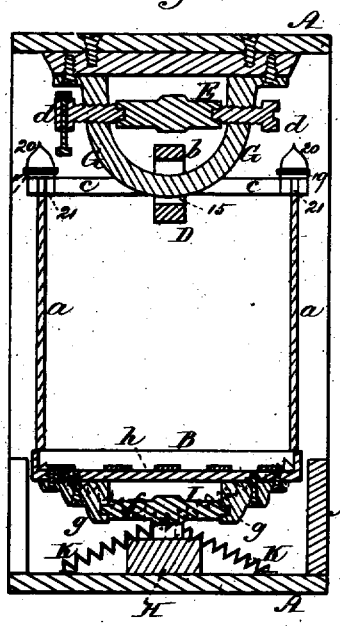
Figure 4:
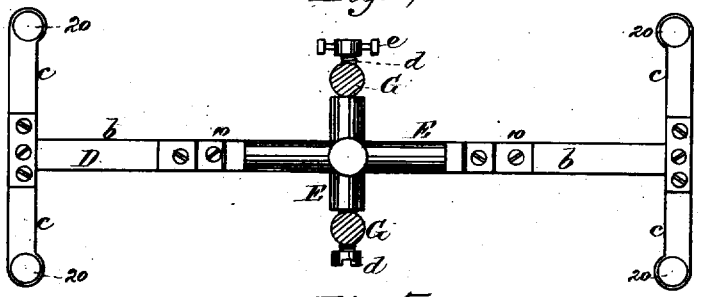
Figure 5:
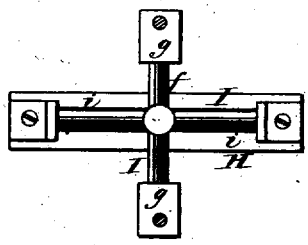

Figure 1 is a perspective view of a self-leveling berth constructed in accordance with my invention. Fig. 2 is a longitudinal vertical section through the center of the same. Fig. 3 is a transverse section on the line *x x* of Fig. 2. Fig. 4 is a horizontal section on the line *y y* of Fig. 2. Fig. 5 is a horizontal section on the line *z z* of Fig. 2; Fig. 6, detail enlarged.

My present invention relates to certain improvements in that class of self-leveling berths for vessels in which the berth or bed is suspended from a swinging frame arranged thereover and adapted to vibrate on both a longitudinal and transverse axis. These berths have heretofore been provided with guides at their ends, the friction of which often prevented the berth from maintaining or quickly recovering its horizontal position; and my invention has for its object to enable me to entirely dispense with these guides, and thus avoid the friction produced thereby, and also to so improve the construction of the berth and the method of suspending or supporting the same that the liability of its becoming set or jammed in any particular position within its casing will be entirely avoided.

To this end my invention consists in a berth suspended from a single swinging frame supported by means of a cross-piece pivoted to the frame and to a hanger in lines at right angles to each other, by which construction, while the frame is free to vibrate on both a longitudinal and a transverse axis, so as to preserve its equilibrium as the vessel pitches or rolls, it is nevertheless confined by the pivots on which it is hung, so as to be thereby prevented from having any movement in a horizontal plane around a vertical axis, and consequently, as the berth is in a great measure controlled in its movements by the frame from which it is suspended, it is prevented from coming into contact with the sides of the casing, while the friction is reduced to a minimum and no obstacle is presented to the free swinging movement of the berth.

My invention also consists in the employment, in connection with the above, of a double swivel or universal joint applied to the under side of the frame of the berth which supports the bed-bottom, for connecting it with cross-beams or other stationary portion of the casing, whereby the berth is more effectually confined in its proper position, and yet allowed to conform exactly in its movements to those of the swinging frame overhead.

My invention furthermore consists in a novel device for securing the ends of the cords by which the berth is suspended to the ends of the swinging frame.

In the said drawings, A represents the casing within which the berth is located. The rectangular frame B of this berth is suspended by wire ropes or cords *a*, secured to its four corners, from a frame, D, which consists of a stout bar or beam, *b*, extending longitudinally over the center of the berth, and provided at each end with a transverse piece, forming two branches or arms, *c c*, to the extremities of which the ends of the wire ropes or cords *a* are connected. The ends of these arms *c* are slightly enlarged, and are each provided with an aperture for the reception of a flanged nipple, 19, through which the end of the cord *a* passes, the top of the aperture in the nipple being countersunk, as seen in Fig. 6, to receive the knotted or enlarged end of the cord, and over this nipple is screwed an ornamental cap, 20, which conceals the end of the cord and holds it down tightly in its place.

The enlarged ends of the branches *c* are each provided with an open slot, 21, through which the cord *a* can be introduced or withdrawn when the nipple is raised up out of its seat, a convenient means being thus afforded for connecting or disconnecting the cords without disturbing the knots or enlargements at their ends. The lower ends of the cords *a* are connected in a similar manner with the corners of the frame B, the screw-caps being here dispensed with.

The bar *b*, which is of the form seen in Figs. 1 and 2, is provided on each side of its center with an upwardly-projecting portion, 10, and between these two projections 10 is pivoted a cross-piece, E, the transverse portion of which is pivoted by means of adjustable screws *d d* within a U-shaped hanger, G, bolted firmly to the under side of the top or ceiling of the casing A and passing through an aperture, 15, in the bar *b*, the pivotal points of the longitudinal and transverse portions of the cross-piece E being arranged in lines at right angles to each other, by which construction the frame D is permitted to vibrate freely on both its longitudinal and transverse axes, so as to preserve its equilibrium as the vessel pitches or rolls, but is prevented from swinging around in a horizontal plane, and consequently, as the movements of the berth B are controlled to a great extent by those of the frame D overhead, from which it is suspended, it is steadied in a great measure thereby, and kept out of contact with the sides of the casing A.

One of the screws *d* is provided with a handle, *e*, similar to that of a vise, by means of which it can be tightened, so as to allow the berth to swing longitudinally with more or less freedom, to adapt it to the weight or size of the occupant, who is thus enabled to instantly adjust this movement to suit the requirements of the case.

If desired, screws similar to those *d* may be employed as pivots for the longitudinal portion of the cross-piece E instead of the construction shown.

In order to still further steady the berth B, the under side of its frame is connected with the bottom of the casing A by means of a double swivel or universal joint composed of a cross-piece, I, similar to the piece E, the transverse portion *f* of which is pivoted between lugs or ears *g*, projecting from the plate *h*, secured to the under side of the berth-frame B, while the longitudinal portion *i* is pivoted between ears projecting up from and secured to a block or beam, H, attached to the bottom of the casing A, a universal-joint connection being thus formed, by which the berth is effectually prevented from swinging around in a horizontal plane, but is at the same time allowed to conform exactly to all of the movements of its supporting-frame D, as desired; and by this construction the guides heretofore employed at the ends of the berth are entirely dispensed with, and the friction thus reduced to a minimum, while at the same time the operation of the berth is rendered much more perfect, and the liability of its becoming set or jammed in any particular position within the casing is thus entirely avoided.

At the head and foot of the berth are a pair of crossed spiral springs, K K, one end of each spring being secured to the berth-frame, and the opposite end to the floor or side of the casing A, these springs, when thus arranged, serving to steady the berth and render it less tremulous, and also to return it to its normal position when not occupied, as a lateral movement in either direction will cause a tension to be brought upon one spring of each pair, and a longitudinal movement in either direction will bring a strain upon one pair or the other of the springs, as the case may be, and by the employment of these springs the necessary stability is given to the berth, while it is nevertheless free to swing and preserve its equilibrium as the vessel pitches or rolls.

Instead of the spiral springs K K, rubber or other suitable springs may be employed, and the points of attachment of these springs to the berth-frame and floor or casing may be changed to suit the requirements of the case.

A berth constructed as above described will preserve its equilibrium or balance and maintain itself in a horizontal position when occupied independently of the vessel's motion, thus removing the causes which induce seasickness, and promoting the comfort of the occupant.

It is evident that racks for supporting glassware, crockery, &c., in ships' cabins, ships' tables, chairs, settees, &c., and the floors of state-rooms may be constructed in a manner similar to the berth above described without departing from the spirit of my invention.

What I claim as my invention, and desire to secure by Letters Patent, is—

1. A berth suspended from a single swinging frame, D, supported by means of a cross-piece, E, pivoted to the frame and to a hanger, G, in lines at right angles to each other, substantially as set forth.

2. An oscillating or vibrating berth, in combination with two universal joints, one above and one below the berth, and each partially sustaining the berth, for the purpose described.

3. The combination, with an oscillating or vibrating berth, of a swinging frame, D, composed of a single bar or beam, *b*, provided at its opposite ends with arms or branches *c*, from the ends of which the berth is suspended by means of cords *a*, said frame being supported by and adapted to oscillate on a cross-piece, E, pivoted to the frame and to a hanger, G, in lines at right angles to each other, substantially as set forth.

4. The combination, with a berth suspended from an overhung swinging frame, D, as described, of the cross-piece I, pivoted to the berth and to a stationary part beneath, in lines at right angles to each other, substantially as and for the purpose described.

5. The combination, with the vibrating berth, of the slotted arms *c*, removable nipples 19, and screw-caps 20, for holding the cords *a*, substantially as set forth.

Witness my hand this 20th day of March, A. D. 1880.

DAVID HUSTON.

In presence of—
P. E. TESCHEMACHER,
W. J. CAMBRIDGE.